250/201

Jan. 26, 1965 C. L. BARCIA ETAL 3,166,997

HYDROSTATIC FILM DISC STABILIZER AND SPACER

Filed June 28, 1961 3 Sheets-Sheet 1

INVENTORS
CASPER L. BARCIA
HENRI A. KHOURY

BY Joe L. Koerber
ATTORNEY

Jan. 26, 1965 C. L. BARCIA ETAL 3,166,997

HYDROSTATIC FILM DISC STABILIZER AND SPACER

Filed June 28, 1961

3 Sheets-Sheet 2

3,166,997
HYDROSTATIC FILM DISC STABILIZER AND SPACER

Casper L. Barcia, Briarcliff Manor, and Henri A. Khoury, Yorktown Heights, N.Y., assignors to International Business Machines Corporation, New York, N.Y., a corporation of New York Filed June 28, 1961, Ser. No. 120,394
8 Claims. (Cl. 95—44)

The present invention relates to hydrostatic air bearings and more particularly to such bearings for effecting plane stability of a flexible rotating disc and for maintaining a transducer at a small and constant distance therefrom.

In the electronic computer art, data memories generally are of a magnetic type such as cores, drums, tapes and discs. The more common magnetic disc storage devices are of the rigid disc type. Another example of the rigid disc store is a glass disc such as that shown and described in U.S. Patent 2,714,841 which carries recorded data in a developed photographic emulsion on one side thereof.

A recent development in magnetic disc storage is the substitution of a flexible disc for the rigid disc. The flexible disc may also be substituted for the rigid glass disc in photographic storage applications.

This substitution of a flexible disc for a rigid disc has the advantage of a significant reduction in cost, particularly in substituting for the glass disc, due primarily to the high cost of glass discs having sufficiently flat surfaces and which are optically pure. Also more uniform emulsions can be obtained by cutting discs from emulsion coated film than by applying a photographic emulsion to a rigid disc. There are also the advantages of less weight, less bulk, and the unbreakable nature of the flexible discs.

However, on the debit side, there is the added problem of stabilizing the flexible disc and at the same time maintaining the necessary small and constant separation of the disc and transducer. With photographically stored data the stabilization problem is particularly critical due to the limited tolerances in the depth of focus of the lens.

Major considerations in the use of the flexible discs are the problems of flutter vibration, mechanical instability due to the flexible boundary, dynamic motion of the flexible disc, and the fact that the disc may have a ten percent thickness variation around its periphery. Aerodynamic flutter must be controlled and the thickness variation must simultaneously be compensated for by servo control of the transducer spacing from the disc surface. In the use of a rigid disc, the problem of stabilizing the disc is not present.

Examples of hydrodynamic air bearing support of flexible discs are given in the January 1961 Proceedings of the IRE (pages 164–174), in U.S. Patent 2,950,353 issued August 23, 1960, and in French Patent 1,119,186 published June 15, 1956. The above references show full hydrodynamic support of a disc as well as support only at a selected point or sector.

The hydrodynamic bearing develops its load carrying capacity from the shearing action between the boundary layers adhering to the moving disc and to the stationary bearing, whereas the hydrostatic bearing is externally pressurized and its load carrying capacity depends only upon the external supply pressure.

French Patent 1,211,792, published March 18, 1960, relates to hydrostatic means for supporting a rotated flexible disc. In this latter patent, two toroidal members of porous material are supplied with pressure whereby air passes through the porous material to opposite sides of the rotated flexible disc to stabilize the disc in a plane between the two porous members. Magnetic reading and recording heads are imbedded in the porous members for reading or recording data on the rotated disc. The two porous members are rigidly fixed relative to one another whereby the spacing therebetween is constant.

Provision of reliable means for stabilizing a flexible disc and for maintaining constant transducer to recording medium separation will permit the computer industry to replace the conventional rigid discs with the improved flexible discs. Such means, in addition to being reliable, preferably should be simple, light weight and inexpensive.

The present invention provides such a device to stabilize the flexible disc and to maintain the constant transducer to recording medium separation even when there is a thickness variation from one sector of the film to another.

Accordingly, a primary object of the present invention is to provide improved apparatus for stabilizing a flexible rotating disc.

Another object of this invention is to provide apparatus for simultaneously stabilizing a flexible rotating disc and maintaining a small but constant separation between the disc and a transducer element.

A further object of this invention is to provide apparatus for stabilizing a flexible rotating disc by means of a pair of opposed hydrostatic air bearings positioned adjacent a radial point of the disc and between which the disc rotates.

Another object of this invention is to provide apparatus for stabilizing a flexible rotating disc while providing a positive air servo effective to follow a variation in disc thickness.

Yet another object of this invention is to provide apparatus for stabilizing a flexible rotating disc and at the same time maintaining a small but constant separation beween the disc surface and a transducer by means of an air bearing sandwich having a fixed portion and a floating portion.

The foregoing and other objects, features and advantages of the invention will be apparent from the following more particular description of a preferred embodiment of the invention, as illustrated in the accompanying drawings.

Figure 1:
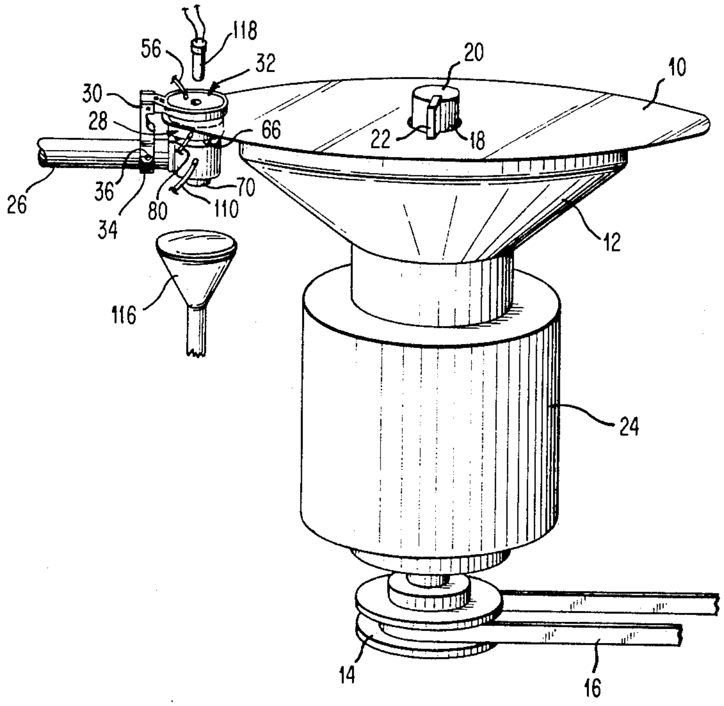
FIG. 1 is a perspective view of the flexible disc driving and stabilizing apparatus.

The environment for the present invention is a thin flexible film disc which may have thickness variations of approximately 10 percent. The disc must be stabilized at low speed, for example, one revolution per minute (r.p.m.) as well as at high speed, for example, 1400 r.p.m.

The invention is described as including a lens which must be kept in focus with an emulsion on the lower side of the film disc whereby data are optically recorded or detected on the emulsion. However, it will be apparent that a magnetic head or other transducer could similarly be positioned within the scope of this invention. Therefore, wherever appropriate, the term lens is intended to include transducers.

The emulsion side of the film must be maintained in plane stability under all dynamic conditions. Using an air bearing sandwich arrangement having a fixed portion or shoe on the upper side of the disc and a floating portion or shoe on the lower side, aerodynamic flutter of a rotating flexible disc can be maintained at an absolute minimum at the point where the disc passes between the two shoes. The stabilization of the disc and the transducer to disc spacing must be maintained even while the fixed and floating shoes are being translated at high speed across a recording annulus for selection of record tracks.

Plane stability within approximately ±50 micro-inches has been obtained. However, the required degree of plane stability is dependent upon the particular recording medium and transducer being used. The term constant or substantially constant as used hereinafter with respect to spacing between a disc surface and an air bearing surface is not intended to limit the spacing to any specific measurement or tolerance but is intended to denote a spacing within tolerances that, depending upon the recording medium and transducer being used, may be considered as constant.

The floating shoe is supported in an air bearing at the end of a lens arm and is preloaded by three pistons to a position closely adjacent to the emulsion side of the disc. The top surface of this floating shoe consists of an inherently compensated air bearing which maintains a lubricating film of air between the shoe and the disc. The disc is backed on the opposite side of a similar, but fixed upper shoe. Both shoes are attached to the lens arm. The lens arm may be translated across the record annulus of the disc by means not shown for selection of annular record tracks.

Ambient air is used as a clean and inexpensive lubricant. The viscosity of the lubricating film of air remains substantially constant, maintaining a constant load carrying capacity. There is no physical contact between the disc and the air bearing. This not only preserves the disc from damage, but also maintains extremely low noise behavior.

Air from a first source is supplied to both the upper and lower shoes and escapes through nozzles in the opposed surfaces of the air bearings whereby it is directed against opposite sides of the flexible disc. With the nozzle pressures equal in both shoes, the flexible disc is maintained equidistant from the upper and lower shoes. When a thickened portion of the disc enters between the two shoes, the spaces between the shoes and the disc are restricted, causing a build-up of pressure which overcomes the pressure on pistons in the floating shoe and moves the floating shoe away from the disc to re-establish the original spacing. When the disc thickness decreases, a decrease in bearing pressure permits the higher pressure on the pistons to move the floating shoe toward the disc so that the spacing of the disc from the shoes is maintained.

Referring to FIGURE 1, a flexible disc 10 is mounted on a rotatable turntable 12 which is rotated by means of a pulley 14 and a belt 16 from a motor not shown. The disc 10 has a central keyed aperture 18 which fits over a stud 20 having a key portion 22 to prevent rotation of the disc relative to the turntable. The turntable 12 is mounted for rotation in a bearing 24. An arm 26 adjacent the turntable supports a lower portion 28 of an air bearing sandwich. This lower portion is floating with respect to the disc 10 and is referred to hereinafter as the lower or floating shoe. The arm 26 also supports a bracket 30 which in turn supports an upper portion 32 of an air bearing sandwich, referred to also as the upper or fixed shoe.

Figure 2:
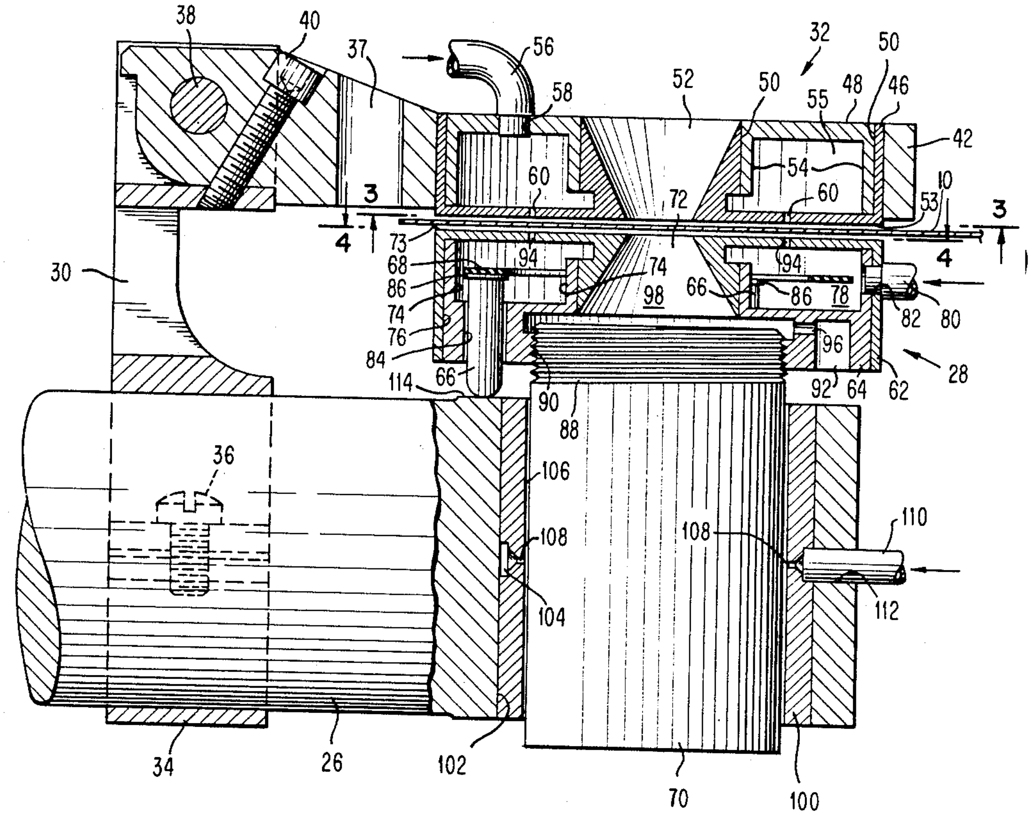
FIG. 2 is a sectional elevation of the air bearing apparatus.
Figure 3:
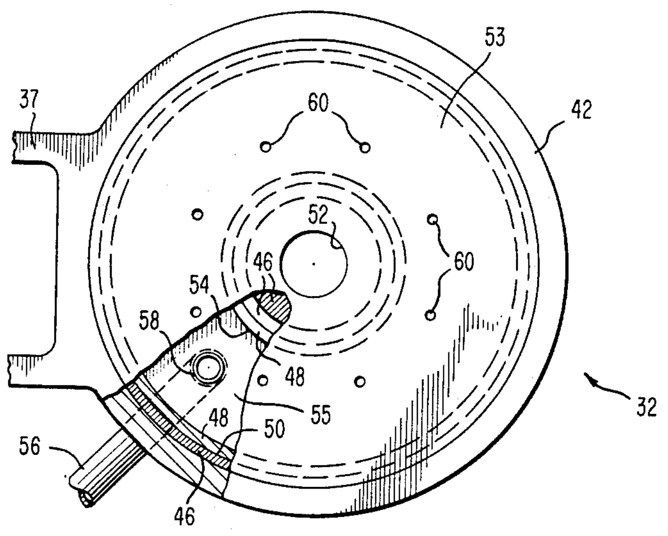
FIG. 3 is a plan view of the upper air bearing, partially broken away, taken along the line 3—3 in FIG. 2.

Referring to FIGURE 2 the bracket 30 is mounted on the arm 26 by means of a half ring element 34 and a pair of screws 36 (one shown). An arm 37 pivotally mounted on the bracket 30 by a pivot pin 38 permits pivoting of the upper shoe 32 away from the lower shoe 28, for example, during loading of a disc 10 therebetween. A set screw 40 is provided for rigidly fixing the arm 37 in the position shown. As best shown in FIGURE 3, the arm 37 terminates in a circular portion 42 within which the upper shoe 32 is fixedly mounted.

Referring to FIGURES 2 and 3, the upper shoe 32, exclusive of the ring 42, consists of two elements 46 and 48. FIG. 3 is partially broken away to better illustrate the construction. The outer element 46 is a circular member having a circular channel defined by the side walls 50 extending completely around and having a bevelled opening defined by the side wall 52 extending through the center of the member 46. The bevelled opening 52 extends from a smaller diameter at the lower surface 53 of the element 46 to a larger diameter at the upper surface.

The element 48 is an inverted circular member having an open circular channel defined by the side walls 54 extending completely around. The element 48 is force fitted into the member 46 to form an enclosed internal channel designated 55. An air supply hose 56 is connected to the internal channel 55 through an aperture 58 in the upper surface of the element 48. Eight orifices 60 arranged in a circle and penetrating the lower surface 53 of the channel element 46 connect the internal channel 55 to the atmosphere. Each orifice 60 is .009 inch in diameter. Air supplied through the air hose 56 flows out through the orifices 60 which are perpendicular to the surfaces 53 and exerts a pressure on the top side of the disc 10. The air bearing surface 53 is approximately .625 inch in diameter.

Figure 4:
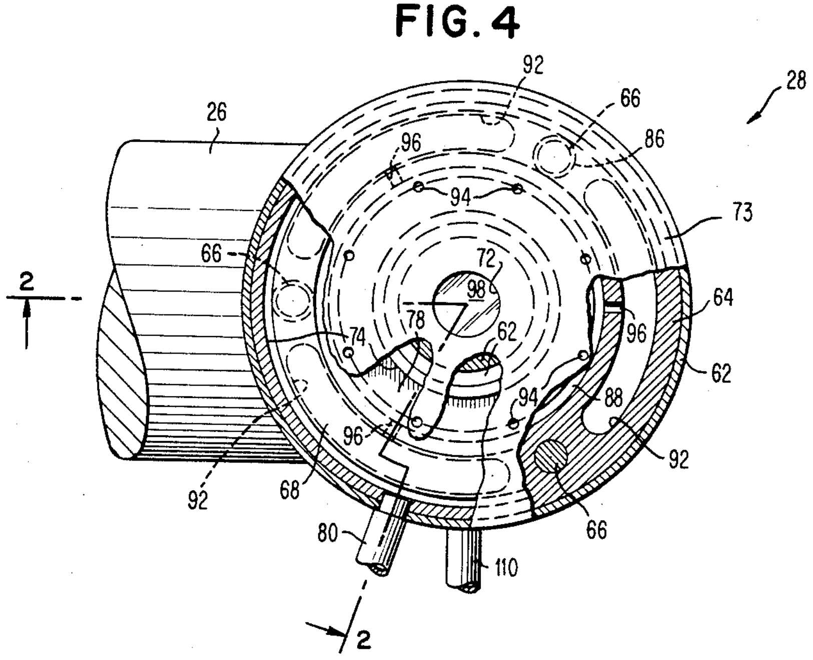
FIG. 4 is a plan view of the lower air bearing, partially broken away, taken along the line 4—4 in FIG. 2.

Referring to FIGS. 2 and 4, the lower shoe assembly 28 consists essentially of two circular channel members 62 and 64, three pistons 66, a rubber ring element 68, and a lens assembly 70. FIG. 4 is broken away on two different levels to better illustrate the construction. Also it is noted that the sectional elevation of FIG. 2 is taken substantially along the line 2—2 in FIG. 4. The channel member 62 includes a bevelled hole defined by the side wall 72 similar to the bevelled hole 52 in the upper shoe 32, except that it is inverted, extending from a smaller diameter at the upper surface 73 to a larger diameter at the lower surface. The inner channel member 64 has a channel at the upper side defined by the walls 74 and extending completely around. The element 64 is force fitted into the element 62 in a channel which is defined by walls 76. A closed internal channel designated 78 is thus formed. Air pressure is supplied to the internal channel 78 through a hose 80 connected through an aperture 82 extending through the side walls of the elements 62 and 64.

Three holes 84 are bored in the bottom of the channel member 64 at points spaced 120° apart to accommodate the three pistons 66 which are retained in place by a flange 86 on the top of each piston. The rubber ring element 68 is adhesively attached to the tops of the three pistons to prevent rotation of the pistons and consequent noise and vibration. Each piston 66 has a diameter of .050 inch.

Threads 88 on the lens assembly 70 engage the threads 90 on the inner surface of the channel element 64. The lens assembly may be adjusted up or down with respect to the floating shoe 28 by means of these threads. These threads thus act as manual means for obtaining focus. Thereafter, the floating shoe keeps the lens in focus. To reduce the weight of the assembly 28, the lower side of the channel element 64 is milled out in three sectors between the piston bores. These sectors being designated 92 in FIGS. 2 and 4.

The upper surface 73 of the channel member 62 contains eight orifices 94 arranged in a circle and corresponding to the orifices 60 in the upper shoe 32. Three bore holes 96 extend from the milled out sectors 92 through the inner wall of the element 64. These holes 96 provide a vent connecting the space 98, formed by the bevelled aperture 72 and the space above the lens assembly 70, to atmosphere through the milled out portions 92.

The lens assembly 70 and consequently the lower shoe assembly 28 which is fixed thereto, is supported on the arm 26 by means of an air bearing 100. A circular bore 102 formed in the end of the arm 26 supports the air bearing 100 which is force fitted in the bore 102. The ring 100 includes a channel 104 which, in the force fit condition of the ring 100 in the bore 102, is air tight. This air tight channel is connected to the inner surface 106 of the air bearing by eight equally spaced orifices 108. Air is supplied to the channel 104 through a supply hose 110 and an aperture 112 in the wall of the bore 102. Air escaping from the channel 104 through the orifices 108 exerts equal pressure from all directions on the lens assembly 70, thereby maintaining this assembly in a central position within the air bearing. The essentially frictionless bearing permits up and down movement of the lens assembly 70 in response to variations in the pressure exerted on the tops of the pistons 66 and the surface 73.

Referring to FIG. 1, light from source 116, such as the beam of a cathode ray tube (C.R.T.) is directed at the lower surface of the lens assembly 70 and is focused by the lens, through the aperture 72, upon photographically recorded data on the disc 10. The light beam passes through non-opaque portions of the disc 10 to a detector unit 118 such as a photomultiplier tube (PMT).

Figure 6:
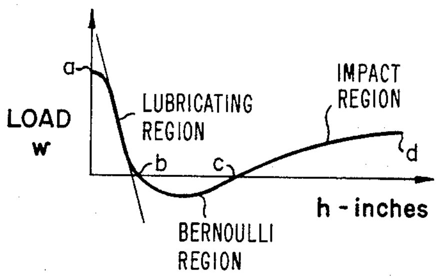
FIG. 6 is a graph showing the general load vs. spacing relationship of a thrust air bearing such as that shown in FIG. 5.
Figure 5:
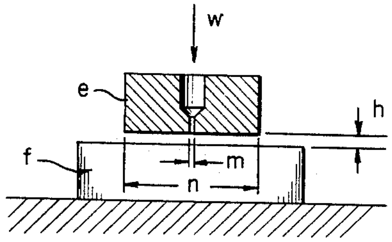
FIG. 5 shows a loaded air nozzle discharging onto a fixed plate.

Using a device consisting of a loaded nozzle discharging onto a plate *f*, as shown in FIG. 5, a curve of load *w* versus air film thickness *h* may be plotted for a given nozzle diameter *m* and air bearing area *n*. Referring to FIGURE 6, this curve may be divided into three regions as follows: the lubricating region, *a–b*; the Bernoulli region, *b–c*; and the impact region, *c–d*. In the Bernoulli region, a region of negative load, the plate is attracted to the nozzle. In the impact region the plate is forced away from the nozzle.

A considerable portion of the lubricating region of the curve in FIG. 6 is substantially linear. For maximum stiffness, an air bearing should be designed to operate at the maximum slope of the lubricating region which is in the linear portion.

Using the air bearing sandwich described hereinbefore, where the load *w* is the air pressure on the pistons, the distance *h* maintained between the nozzle (orifices 60–94) and the plate (disc 10) is relatively insensitive to changes in the applied pressure.

*Operation*

With pressure applied to the input hoses 56 and 80, air flows into the internal channels 55 and 78, through the orifices 60 and 94 against both faces of the film disc 10 and outward to the outer edges of the air bearing surfaces 53 and 73 as well as inward to the bevelled apertures 52 and 72. Air flows through the aperture 52 to atmosphere and from the aperture 72 through the apertures 96 and milled out sections 92 to atmosphere. In thus flowing, the air exerts stabilizing forces on the film disc at the point then passing between the air bearing shoes. If the supply pressures at 56 and 80 are equal, the film disc 10 is maintained substantially equidistant from the shoes 32 and 28. If the pressures are unequal, the disc will be stabilized in a plane closer to the shoe having the lower pressure.

It is preferable to have the pressures equal so that faltering or failure of the air supply will have the least effect on the stability of the disc. For this reason, it is desirable to have a common supply for both shoes.

The air supplies to the lower shoe 28 not only flows through the orifices 94 against the film disc but also bears, through the rubber element 68, upon the tops of the three pistons 66. These three pistons bear on the top surface of the arm 26. This pressure applied to the tops of the pistons tends to force the pistons downwardly, but since the pistons rest upon the surface 114 of the arm 26, the floating shoe assembly 28 is forced upward to a point at which the pressure applied to the tops of the pistons is equal to the pressure exerted on the surface 73 by the air escaping between the shoe and the disc 10. The shoe assembly 28 will remain in this position until a variation in the thickness of the film disc causes a change.

Thus, when a thicker or a thinner portion of the disc 10 moves between the upper shoe 32 and the lower shoe assembly 28 the space $h_1$ between the shoe 32 and the disc 10 and the space $h_2$ between the disc 10 and the shoe assembly 28 will be maintained by appropriate shifting of the assembly 28 and the disc 10.

Movement of the disc 10 relative to the shoe 32 is dependent upon whether the upper surface of the disc diverges from the plane of rotation, whereas, any variation in thickness of the disc, whether on the upper, lower or both sides of the disc, causes a shifting of the floating shoe assembly 28.

The distance $h_1$ between the fixed shoe 32 and the disc will be maintained with somewhat less precisions than the distance $h_2$, due to the ability of the floating shoe assembly 28 to more accurately follow thickness variations. However, since the lens is carried by the floating shoe, the lesser precision in maintaining the space $h_1$ is not critical.

A thickened portion of the disc moving between the air bearing surfaces reduces the spacing between the film disc and the shoe surfaces thus constricting the escape passages and causing a build-up in pressure between the disc 10 and the surfaces 53 and 73. This pressure on the shoe assembly 28, surface 73, exceeds the internal pressure on the pistons 66 and thus moves the shoe assembly 28 downwardly. When the original spacing between the disc 10 and the shoe 28 is achieved, the pressure on the surface 73 and on the tops of the pistons 66 is again equal.

Similarly, when a thinner portion of the film disc 10 moves between the shoes 32 and 28, the spacing between the disc 10 and the surfaces of the shoes increases. The pressure on the surface 73 at this point is lower than the pressure on the tops of the pistons 66, whereby the pistons 66 force the shoe assembly 28 upwardly until the spacing and pressure are again re-established at equilibrium. As described hereinbefore this up and down movement of the shoe assembly 28 is substantially frictionless due to the air bearing 100 in which the assembly is mounted.

It is noted that the pressure applied to the pistons in the embodiment shown herein is the same pressure applied to the bearing and therefore changes in pressure have substantially no effect upon the air film thickness since a change in bearing pressure is accompanied by the same change in piston pressure.

The weight of the floating shoe must be kept as low as possible to permit high tracking response to disc thickness variations. For example, based on a piston preload of approximately one pound and a floating shoe assembly weight of .025 pound $$\text{acceleration} = \frac{\text{piston preload} - \text{weight of shoe}}{\text{weight of shoe}}$$

$$a = \frac{P - w}{w} g$$

where $g$=the acceleration of gravity $$a = \left(\frac{1 - .025}{.025}\right) g = 39g$$

Based on a tracking acceleration of $39g$, the response time to track a .001 inch disc face variation is:

$$t = \sqrt{\frac{2s}{a}}$$

where $s$=the variation in inches $$t = \sqrt{\frac{2(.001)}{39(386)}} = 364 \text{ microseconds}$$

While the invention has been particularly shown and described with reference to a preferred embodiment thereof, it will be understood by those skilled in the art that various changes in form and details may be made therein without departing from the spirit and scope of the invention.

What is claimed is:

1. Apparatus for stabilizing a flexible disc at at least one radial point comprising, in combination, a plane circular record disc of flexible material, means for rotating said disc, a pair of elements having opposing air bearing surfaces positioned at said radial point adjacent to opposite side of said disc, each said element having an external air supply and a plurality of orifices directing air from said opposed surfaces against said disc and each said element having a central aperture associated with record transducer means.

2. Apparatus for stabilizing a flexible rotating disc at at least one radial point and for maintaining one side of said disc a constant distance from a transducer comprising, in combination, a plane circular disc of flexible material, means for rotating said disc, a pair of elements having opposing air bearing surfaces positioned at said radial point adjacent to opposite sides of said disc and parallel to the plane of rotation of said disc, each said element having an external air supply and plural orifices directing air from said surface against said disc, one said element being fixed in a plane parallel to said plane of rotation, the other said element being mounted in fixed means parallel to said plane of rotation, each said bearing element including an internal channel connected to said external air supply and to said orifices, said other element being adapted for longitudinal movement along an axis perpendicular to said plane of rotation and having a plurality of pistons extending from said internal channel and bearing upon said fixed mounting means to effect compensating movement of said other element in response to variation in pressures on said pistons and on said disc caused by variation of thickness of portions of said disc passing between said elements.

3. The apparatus of claim 2 wherein said movable element carries a transducer which is maintained said constant distance from the adjacent surface of said disc.

4. The apparatus of claim 2 wherein said movable element carries a lens which is maintained said constant distance from the adjacent surface.

5. The apparatus of claim 2 having auxiliary means for moving said lens along said axis relative to said movable element.

6. The apparatus of claim 2 wherein said movable element is supported in an air bearing.

7. Apparatus for stabilizing a flexible disc at at least one radial point comprising, in combination, a plane circular record disc of flexible material, means for rotating said disc, a first hydrostatic air bearing element fixed in a plane adjacent to one side and parallel to the plane of rotation of said disc and operative to maintain an adjacent surface of said disc a constant distance from said first element, means for supplying external pressurized air to said first element, a second hydrostatic air bearing element mounted in a fixed member adjacent to the opposite side of said disc and movable in said fixed member along an axis perpendicular to said plane of rotation, a plurality of movable pistons bearing upon said fixed mounting member, and an air supply commonly operating upon said opposite side of said disc and upon said pistons to maintain said second element a constant distance from said opposite side.

8. Apparatus for stabilizing a flexible rotating disc at at least one radial point comprising, in combination, a plane circular disc of flexible material, means for rotating said disc, a pair of circular elements having opposing air bearing surfaces positioned at said point adjacent to opposite sides of said disc, each said element having an external air supply, and means directing air from said opposed surfaces against said disc including a plurality of orifices arranged in a circle concentric with said circular element and perpendicular to the related said surfaces.

References Cited in the file of this patent

FOREIGN PATENTS 1,211,792 France ---------------- Oct. 12, 1959